June 7, 1966 W. GITH 3,255,385

DEVICE FOR ACCELERATED SWITCH RELEASE BY MECHANICAL CONTACTS, PARTICULARLY YARN GUARDS IN TEXTILE MACHINERY

Filed Feb. 15, 1963

INVENTOR
Walter Gith 3,255,385
Patented June 7, 1966

3,255,385

DEVICE FOR ACCELERATED SWITCH RELEASE BY MECHANICAL CONTACTS, PARTICULARLY YARN GUARDS IN TEXTILE MACHINERY

Walter Gith, Monchen-Gladbach, Germany, assignor to Walter Reiners, Monchen-Gladbach, Germany Filed Feb. 15, 1963, Ser. No. 258,775
Claims priority, application Germany, Mar. 17, 1962, R 32,312
6 Claims. (Cl. 317—151)

Figures 1, 2:
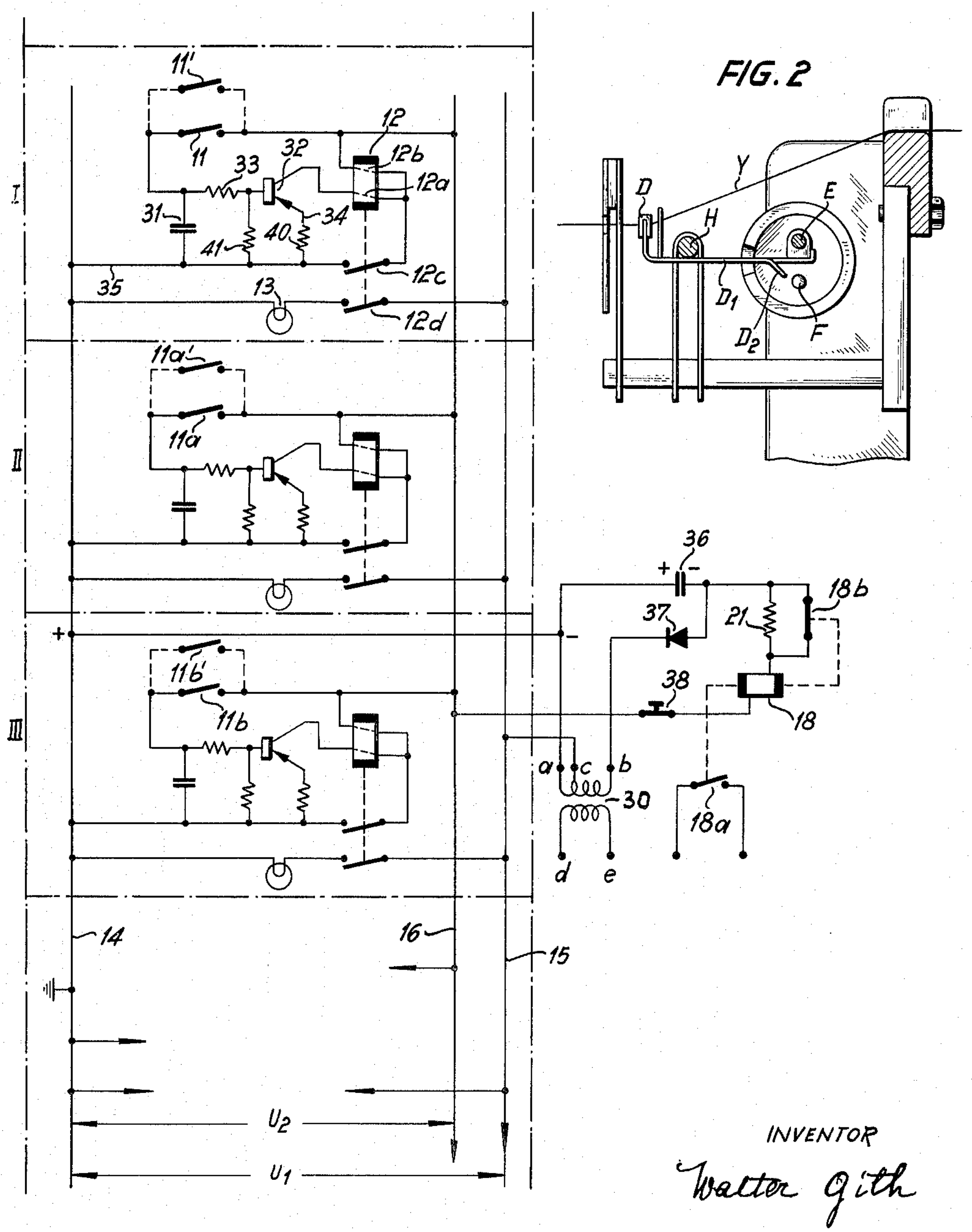

My invention relates to electric circuits in which a switching operation is released by mechanical contacts liable to bounce when actuated. In a more particular, though not exclusive aspect, my invention concerns a switch releasing device controlled by yarn guards or drop wires as employed in textile machinery, such as warp-beaming machines, and constituting mechanical contacts of extremely light weight and hence pronounced bouncing tendency.

When the switching operation of an electric apparatus such as an electromagnetic relay or contactor, is released under control by a mechanical contact subject to bouncing, the control circuit is not immediately closed a sufficiently long time for initiating the desired switching performance. There occur a number of circuit closing and opening pulses, and the control circuit is sufficiently energized only after the bouncing period has substantially ended. Numerous proposals have been made toward eliminating the delay in switching performance caused by such bouncing at the releasing contact. Many of these proposals involve eliminating such bouncing by mechanical means. This involves an addition of structure or mass, thus increasing weight and space, of the equipment, this is not always a suitable solution of the problem, particularly in cases where the releasing contact must be as light in weight as the above-mentioned yarn guards or drop-wire contacts in textile machinery.

It is an object of my invention, therefore, to devise an electric switching network with a switch releasing mechanical contact generally of the above-mentioned type, that reliably eliminates the detrimental effect of bouncing and thus reduces the delay heretofore associated with bouncing phenomena, without requiring mechanical expedients apt to increase the weight or space requirements of the releasing contact.

According to my invention, the mechanical contact that is to release the switching performance and is apt to bounce when being closed, is connected in series with a capacitor to voltage supply means so that the capacitor becomes charged at the first closing pulse of the contact, and the resulting capacitor voltage is used for controlling an electronic switch whose load circuit directly or indirectly takes care of the switching performance desired. I thus take advantage of the fact that the series-connected capacitor becomes charged virtually instantaneously by the first bouncing pulse, and I provide for the capacitor a resistive discharge circuit in order to apply the capacitor voltage for the control of the electronic switch preferably consisting of a semiconductor device such as a transistor, although an electronic tube or other electronic switching device is also applicable.

I preferably connect a high-ohmic resistance member across the capacitor so that the discharge of the capacitor occurs rather slowly, and I utilize this discharge for the control of the electronic switch.

The electronic switch may be employed in known manner for directly controlling the load circuit. However, the invention is applied with particular advantage by controlling the load circuit proper with the aid of a switching relay of the electromagnetic type. If the mechanical contact transmitter were directly connected in the control or coil circuit of such an electromagnetic relay, the relay could respond only after the mechanical contact has completed a permanent connection. During the bouncing interval, the armature of the relay would not be attracted, and the load circuit controlled by the relay would remain virtually unaffected during the entire bouncing period. However, by connecting the mechanical contact in series with a capacitor and employing the initial capacitor charge for controlling an electronic switch whose main path is connected in the control circuit of an electromagnetic relay, the response of the relay is accelerated because it will respond at the first bouncing pulse of the releasing contact.

The invention will be further described with reference to an embodiment illustrated by way of example in the accompanying drawing, in which:

FIG. 1 is a schematic circuit diagram of a signal-lamp system for mutually interlocked control of the lamps by drop-wire contacts of a beaming machine; and FIG. 2 shows schematically one of the drop-wire switches.

The example of a blocking network for the signal lamps of a beam warper has been chosen for illustration because the invention is of particular importance in conjunction with textile machinery in which the yarn guards or drop wires normally resting against respective textile threads but dropping or flinging out when the thread breaks, constitute mechanical release contacts of extremely small weight whose bouncing tendency cannot in practice be avoided by the known devices.

A drop-wire switch of this type is exemplified by the embodiment shown in FIG. 2. A vertically movable wire D rests upon a thread of yarn Y. The wire D is fastened to an arm $D_1$ rotatable about a pin E. When the yarn Y breaks, the wire D drops, and arm $D_1$ turns counterclockwise about pin E until an extension $D_2$ of arm $D_1$ engages a fixed contact pin F. This closes a circuit connected to pins E and F. A stop rail H limits the upward travel of arm $D_1$ and wire D when the yarn tension increases.

The circuit diagram shown in FIG. 1 relates to a warper or creel with groups of yarn guards, such as drop-wire switches according to FIG. 2, each group comprising a multiplicity of such switches. When a thread in a yarn-guard group breaks, a signal lamp appertaining to that group is lit. The individual groups are identified in FIG. 1 by dot-and-dash enclosures denoted by I, II, III. Of the parallel connected yarn-guard contacts within each group, one is shown schematically in full lines and denoted by 11, 11*a* and 11*b* respectively. A second contact in each group is shown by a broken line and denoted by 11', 11*a'*, 11*b'* respectively. All other yarn-guard contacts in each group are connected in parallel to the two contacts shown. Each group comprises an electromagnetic relay 12 with a high-ohmic winding 12*a* and a low-ohmic winding 12*b* both connected in series with the parallel-connection of yarn guards in that group. Each relay has a normally open main contact 12*d* for closing the circuit of the above-mentioned signal lamp 13, and a normally open self-holding contact 12*c*. Once the relay 12 has picked up, its self-holding contact 12*c* short-circuits the high-ohmic winding 12*a*, and the relay then remains held in only by energization of its low-ohmic winding 12*b*.

All signal lamps 13 are connected in series with the respective relay contacts 12*d* between two buses 14 and 15 supplied with voltage $U_1$. The yarn-guard contacts 11 in series with the two windings 12*b*, 12*a* of relay 12 are connected between two buses 14 and 16 which receive voltage from the output terminals *a* and *b* of a transformer 30 in series with the control winding of a clearing relay 18. The terminals *d*, *e* of the primary winding are to be connected to an alternating-current supply line. The voltage $U_2$ between buses 14 and 16 thus results from a voltage-divider connection which comprises the resistance of the relay windings 12*a*, 12*b* and the resistance of the relay winding 18.

As mentioned above, if windings 12*a*, 12*b* were directly energized through the drop-wire contact 11, the relay 12 could not respond immediately upon the first closing of contact 11. This is because the self-holding contact 12*c* can close only after the armature of the relay is fully attracted, and this would take place after the drop wire or pin of contact 11 had terminated its bouncing motion. To make certain that the relay 12 will respond at the first contact closure of the drop-wire contact 11 and will then attract its armature and keep it attracted, a capacitor 31 is connected in series with the drop-wire switch 11 between the voltage supplying buses 14 and 16. At the first closing pulse of contact 11 the capacitor 31 is charged immediately, and the charging voltage is then employed for controlling an electronic switch which in the illustrated embodiment consists of a transistor 32. The base of the transistor is connected by a high-ohmic resistor 33 with one pole of the capacitor 31 and the emitter is connected through another resistor 40 with the other pole of the capacitor. The capacitor discharge current thus flowing through resistor 33 and through the base of the transistor 32 turns the transistor on, so that its emitter-collector path becomes conductive and connects bus 16 with bus 14 through windings 12*b*, 12*a* of relay 12, the transistor 32 and leads 34, 35.

Consequently, as soon as yarn guard 11, or any other of the parallel connected yarn guards in the same group, closes in response to yarn breakage, the capacitor 31 is instantaneously charged at the first bouncing pulse. The charge passes slowly through the high-ohmic resistor 33 and the base of transistor 32, thus causing the transistor to energize the windings 12*a* and 12*b* of relay 12. Despite any fluttering contact engagement of yarn 11, a substantially uniform control current passes from capacitor 31 through the base path of the transistor. Hence, no interruption in the closing condition of the transistor takes place for a sufficient interval of time to make the electromagnetic relay 12 pick up.

Connected between the secondary terminals *a* and *b* of transformer 30 is a capacitor 36 in series with a diode 37. Capacitor 36 is continuously connected to the voltage of transformer 30 independently of the switching condition of the yarn guards. Assuming, for example, that the transformer furnishes between terminals *a* and *b* an alternating voltage of 24 volts, the capacitor 36 is charged throught rectifier diode 37 to a somewhat higher voltage of about 40 volts in unloaded condition. This increased direct voltage of capacitor 36 is impressed through the winding of clearing relay 18 and through a normally closed reset switch 38 upon the bus 16 and thus upon all yarn guards. Due to the increased charging voltage of capacitor 36, the relay 12 and the clearing relay 18 are energized particularly rapidly at the same time.

As soon as the contact 12*c* of relay 12 closes, it connects the bus 16 through the low-ohmic winding 12*b* with the positive (grounded or mass) pole constituted by the bus 14. As a result, and by virtue of the voltage division effected by the clearing relay 18 and by the fact that a series resistor 21 becomes inserted into the circuit when contact 18*b* of relay 18 opens, the direct voltage at bus 16 decreases considerably, in the present example down to approximately 2 volts. This residual voltage is insufficient to effect further switching operations in the other groups II, III and so forth of the system so that only the signal lamp 13 switched on by the first-energized relay 12 remains lit. In this manner, the relay 12 operates as an interlock or blocking relay for all other groups, so that the closing of any additional drop wires or drop pins cannot light further signal lamps. The signal lamp 13 remains lit until the machine is again started, namely when the switch 38 is opened, for example by the same foot pedal that causes the machine to commence operating. This interrupts the self-holding circuit previously maintained through the closed contact 12*c* of the blocking relay 12. The buses 14 and 15 through which the lamps 13 are energized under control by the relay contact 12*b*, receive voltage from the secondary winding of transformer 30 which has a tap contact *c* connected to the bus 15. In this manner, the lamps are operated with a lower voltage than the relays, for example 6 or 8 volts.

The resistor 40 in lead 34 of the above-mentioned discharge circuit for capacitor 31 serves for temperature stabilization of transistor 32 and in some cases may be omitted or short-circuited. Also provided is a resistor 41 likewise for temperature stabilization which may also be omitted, in which case no direct connection from resistor 33 to lead 35 exists. When resistor 41 is provided, a small portion of the charge from capacitor 31 is shunted through resistor 41 away from the base of transistor 32. This portion of discharging current, with a suitable dimensioning of the resistors 40 and 41, is so slight that it does not impair the above-described performance of the switching network.

As mentioned above, the invention is particularly advantageous in conjunction with textile machines that must operate with unprotected contacts. Due to the high-ohmic resistance in the circuit of the drop-wire contact 11, only extremely slight currents pass through these contacts so that any increasing contact resistance due to soiling or oxidation does not appreciably affect the performance.

To those skilled in the art it will be obvious, upon a study of this disclosure, that switching networks and devices according to my invention can be given a variety of modifications and uses and hence can be embodied in devices and machines other than particularly illustrated and described herein, without departing from the essential features of my invention and within the scope of the claims annexed hereto.

I claim:

1. In an electric switching network having switch-releasing mechanical contact means subject to bouncing when actuated, the combinatiton of a device for accelerating the switching performance comprising voltage supply means, a capacitor connected to said supply means in series with said contact means to be charged at the first closing pulse of said mechanical contact means, an electromagnetic relay having a low-ohmic winding and a high-ohmic winding and having respective load-control self-holding contacts controlled by said windings, current supply leads for said relay, a normally open electronic switch comprising a transistor having a main path serially connected with said two windings between said two leads and having a control member for closing said electronic switch, a resistance circuit connected across said capacitor to provide a low capacitive discharge voltage resulting from said first pulse, said control member being connected with said resistance circuit for controlling said electronic switch to energize said windings in response to said discharge voltage, and said self-holding contact being connected in shunt relation to said high-ohmic winding but in series relation to said low-ohmic winding whereby the latter winding keeps said relay active after it has picked up.

2. In an electric switching network according to claim 1, said electronic switch being a semiconductor device, and said self-holding contact being connected across the series connection of said semiconductor device and high-ohmic winding for inactivating both once said relay has picked up.

3. An electric switching network comprising a yarn-guard member for textile machinery, said member forming a normally open mechanical contact, voltage supply means and a capacitor connected in series with said contact whereby said capacitor is charged at the first closing pulse of said contact, an electronic switch comprising a transistor having an output circuit to be switched and having a control circuit connected with said capacitor for controlling said switch by a low voltage capacitive discharge resulting from said first pulse.

4. An electric switching network comprising a yarn-guard member for textile machinery, said member forming a normally open drop-wire contact subject to bouncing when closing, voltage supply means, a capacitor connected to said drop-wire contact, said capacitor and said drop-wire contact being connected to said voltage supply means for charging said capacitor at the first closing pulse of said drop-wire contact, a signal circuit, an electromagnetic relay having a low-ohmic winding and a high-ohmic winding and having respective signal and self-holding contacts controlled by said windings, said signal contact being connected to said signal circuit for actuating it in response to closing of said drop-wire contact, current supply leads for said relay, a normally open electronic switch comprising a transistor having a main path serially connected with said two windings between said two leads and having a control member for closing said electronic switch, a resistance circuit connected across said capacitor to provide a low capacitive discharge voltage resulting from said first pulse, said control member being connected with said resistance circuit for controlling said electronic switch to energize said windings in response to said discharge voltage, and said self-holding contact being connected in shunt relation to said high-ohmic winding but in series relation to said low-ohmic winding whereby the latter winding keeps said relay active after it has picked up.

5. An electric switching network, comprising voltage supply means;

electromagnetic switching means having control means;

electronic switching means comprising a transistor having control means, said electronic switching means being connected to the control means of said electromagnetic switching means for controlling the operation of said electromagnetic switching means;

a capacitor connected to the control means of said electronic switching means for controlling the operation of said electronic switching means by capacitive discharge, said capacitive discharge having a low voltage; and mechanical switching means connected between said voltage supply means and said capacitor, said mechanical switching means being adapted to close and being subject to bouncing when activated, said mechanical switching means permitting said voltage supply means to charge said capacitor upon the first closing of said mechanical switching means.

6. An electric switching network as claimed in claim 5, further comprising a resistive discharge circuit connecting said electronic switching means across said capacitor.

References Cited by the Examiner

UNITED STATES PATENTS

| | | | |
|---|---|---|---|
| 2,772,551 | 12/1956 | Haas | 200—61.18 X |
| 3,021,401 | 2/1962 | Young | 200—61.18 |
| 3,084,311 | 4/1963 | Culbertson | 317—151 |
| 3,098,953 | 7/1963 | Herr | 317—148.5 |
| 3,114,083 | 12/1963 | Winchel | 317—151 X |
| 3,116,441 | 12/1963 | Gieffers | 317—148.5 |
| 3,133,275 | 5/1964 | Cohrt et al. | 317—148.5 |

FOREIGN PATENTS

| | | |
|---|---|---|
| 751,760 | 7/1956 | Great Britain. |

OTHER REFERENCES

General Electric Transistor Manual, sixth edition, copyright 1962, page 104, Fig. 7.5.

SAMUEL BERNSTEIN, *Primary Examiner.*

R. V. LUPO, *Assistant Examiner.*